United States Patent [19]

Fisherman

[11] Patent Number: 4,796,214
[45] Date of Patent: Jan. 3, 1989

[54] INTEGRAL CALCULATOR AND ADDRESS BOOK

[75] Inventor: Carl Fisherman, Old Bethpage, N.Y.
[73] Assignee: Photo Audio Consumer Electronics Marketing Corp., New York, N.Y.
[21] Appl. No.: 817,498
[22] Filed: Jan. 9, 1986
[51] Int. Cl.[4] .................................................. G06F 3/02
[52] U.S. Cl. ................................................. 364/705.01
[58] Field of Search ................ 364/705, 708; 150/147; 283/63 R, 64; 206/425; D19/26, 27, 21, 86; D3/60

[56] References Cited

U.S. PATENT DOCUMENTS

| | | | |
|---|---|---|---|
| D. 274,179 | 6/1984 | Siwula | D19/26 |
| D. 290,375 | 6/1987 | Nava | D19/26 |
| 4,096,577 | 6/1978 | Ferber et al. | 364/708 X |
| 4,222,109 | 9/1980 | Siwula | 364/715 |
| 4,224,675 | 9/1980 | Pinkerman | 364/705 |
| 4,308,588 | 12/1981 | Siwula | 364/705 X |
| 4,587,409 | 5/1986 | Nishimura et al. | 364/705 X |
| 4,670,853 | 6/1987 | Stepien | 364/705 |

FOREIGN PATENT DOCUMENTS 197806 6/1978 France ................................. 364/705

Primary Examiner—Gary V. Harkcom
Assistant Examiner—Tan V. Mai
Attorney, Agent, or Firm—Ezra Sutton

[57] ABSTRACT

A pocket secretary which includes a calculator and booklet integrally connected to it. The calculator forms the front cover of the booklet and the booklet is closed by a back cover to form a slim, compact and portable pocket secretary.

9 Claims, 1 Drawing Sheet

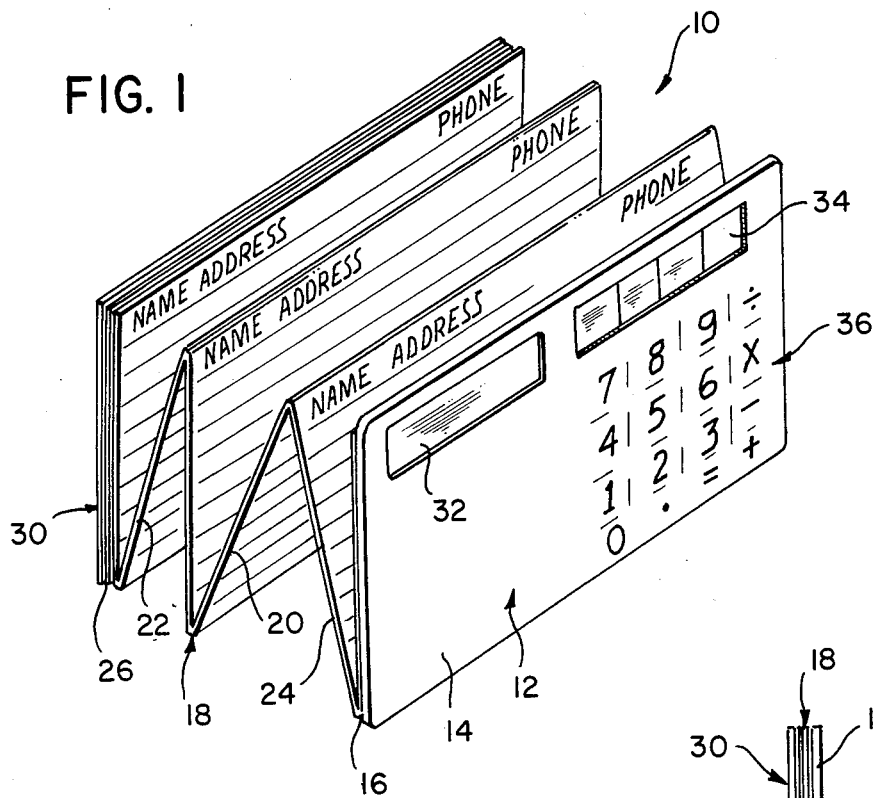
FIG. 1
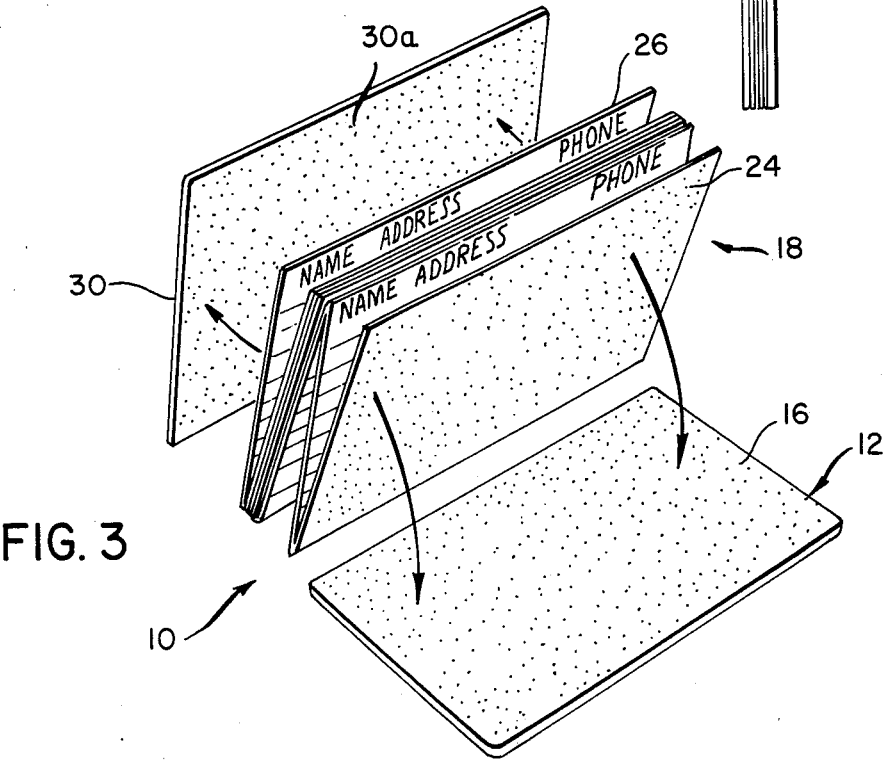
FIG. 2
FIG. 3

INTEGRAL CALCULATOR AND ADDRESS BOOK

FIELD OF THE INVENTION

The present invention generally relates to a pocket secretary which includes a calculator having a booklet attached thereto, and thus provides an efficient, compact, portable and easy to use pocket secretary.

BACKGROUND OF THE INVENTION

In the prior art, there are a number of folder-type arrangements which include a calculator mounted on one side of the folder and some form of a notepad mounted on the other side of the folder. Relevant patents in this regard include U.S. Pat. Nos. 4,096,577; 4,308,588; 4,222,109; and 4,224,675. In all of these arrangements, the folder which contains the calculator and checkbook or the like, is relatively bulky.

The drawback of such prior arrangements is that they are not sufficiently compact and slim to be easily handled and carried in one's pocket. In addition to the calculator and booklet, the folder in which they are mounted provides a bulky and cumbersome additional article to be carried around by the user, which makes the overall combination undesirable as a compact pocket secretary.

Broadly, it is an object of the present invention to provide an improved pocket secretary which overcomes one or more of the drawbacks of the prior art. Specifically, it is within the contemplation of the present invention to provide an improved pocket secretary which is slim, lightweight, portable, compact, efficient, and easy to use, and includes a minimum of parts and elements.

It is a further object of the present invention to provide an improved pocket secretary which eliminates the use of a supporting folder, and integrates into one unit a calculator and an address book or a notebook, wherein the calculator acts as the front cover, and a back cover is provided to enclose the address pages or notebook pages.

SUMMARY OF THE INVENTION

Briefly, in accordance with the principles of the present invention, an improved pocket secretary is provided which is slim, compact and lightweight. The pocket secretary includes a calculator which may be of the conventional type and includes a front surface having means for receiving and displaying data, such as input keys and a digital display screen. In addition, the calculator includes a microprocessor and a back plate for covering the back of the calculator. The pocket secretary also includes a plurality of pages in the form of a notebook or address book, for receiving and recording information. In the preferred embodiment, the plurality of pages are connected together to form a booklet. One page of the booklet is adhered to the back plate of the calculator so that the calculator and booklet form an integral pocket secretary. In addition, the last page of the booklet is provided with a back cover for covering the plurality of pages. In the preferred embodiment, the back cover is movable relative to the back plate of the calculator.

In the preferred form of the invention, the back plate of the calculator is formed of metal, and the back cover of the booklet is magnetized. When the pages of the booklet are closed, the back cover of the booklet is magnetically attracted to the back plate of the calculator to keep the booklet closed.

Advantageously, as a result of the present invention, there is provided a slim, lightweight and compact pocket secretary. Since the booklet and its pages are permanently attached to the calculator, they are easily kept in one place by the user. In the past, address books, notebooks, calculators and the like were separate from each other and difficult to keep track of, to handle and to use.

BRIEF DESCRIPTION OF THE DRAWINGS

Further objects, features, and advantages of the present invention will become apparent upon the consideration of the following detailed description of a presently preferred embodiment when taken in conjunction with the accompanying drawings, wherein:

FIG. 1 is a perspective view of a pocket secretary embodying the principles of the present invention;

FIG. 2 is a side elevational view of the invention; and

FIG. 3 is a perspective view showing the pages of the booklet being adhered to the back plate of the calculator and the back cover.

DETAILED DISCUSSION OF PREFERRED EMBODIMENT OF THE INVENTION

Referring now to FIG. 1, there is shown a preferred embodiment of the pocket secretary of the present invention designated by the reference numeral 10 which includes the following components: a calculator 12 having a front surface 14 and a back plate 16; a booklet 18 having a plurality of pages 20, 22, 24, 26, 28, etc; and a magnetized back cover 30.

The calculator 12 includes on front surface 14 a digital display screen 32, light receiving cells 34, and pressure sensitive keys 36 for supplying data to the calculator. The calculator also includes a conventional microprocessor (not shown). As shown in FIG. 3, the back surface 16 of the calculator 12 has applied thereto adhesive or other suitable means for adhering the booklet 18 to the back plate 16. In the preferred embodiment, one page 24 of the booklet 18 has adhesive applied thereto for adhering it to the back plate 16 of the calculator 12.

As also shown in FIG. 3, the back cover 30 has adhesive applied to the inner surface 30a so that it can be adhered to the last page 26 of the booklet 18. In the preferred form, the back plate 16 is formed of metal and the back cover 30 is magnetized so that when back cover 30 is closed relative to back plate 16, back cover 30 is maintained in its closed position as a result of the magnetization.

Although the booklet 18 has been shown in the form of a continuous strip folded into pages in accordion fashion wherein the pages are attached to each other at their opposite edges, other forms of booklets may be employed within the scope of the present invention. In addition, although the pages of booklet 18 have been shown for recording information, such as names, addresses and telephone numbers, it should also be understood that it within the scope of the present invention that other types of pages can be included such as memo pages for receiving notes, calendar pages, diary pages, and/or appointment pages.

Although the calculator 12 shown in the preferred embodiment is in the form of a solar powered calculator, it should also be understood that it is within the scope of the present invention that other forms of compact and thin calculators may be employed instead of a solar powered calculator as shown in the drawings.

In view of the foregoing, there has been provided in accordance with the present invention, an improved pocket secretary which is slim, lightweight, compact, easy to use, and which avoids the problems of the past wherein the user had to look around for his or her calculator which was separate from notepads, address books, and the like.

A latitude of modification, change, and substitution is intended in the foregoing disclosure, and in some instances, some features of the invention may be employed without a corresponding use of other features. Accordingly, it is appropriate that the appended claims be construed broadly and in a manner consistent with the spirit and scope of the invention herein.

What is claimed is:

1. A combined calculator and booklet comprising:
   (a) a calculator including a front surface having means for receiving and displaying data and a back plate;
   (b) a plurality of pages for receiving information connected together to form a booklet;
   (c) one page of said booklet being connected to said back plate such that said calculator forms a front cover for said booklet;
   (d) a back cover connected to said booklet for covering said pages, said back cover being movable relative to the back plate of said calculator; and
   (e) said back plate being formed at least in part by metal, and wherein said back cover is magnetized, so that when said back cover is closed relative to said back plate, said back cover is held in its closed position by magnetic attraction to said back plate.

2. A combined calculator and booklet in accordance with claim 1 wherein said back cover is connected to the last page of said booklet for closing said booklet.

3. A combined calculator and booklet in accordance with claim 1 wherein said pages are in the form of a continuous strip folded to form pages which can be opened and closed.

4. A combined calculator and booklet in accordance with claim 1 wherein said pages include indicia and guidelines for recording address information.

5. A combined calculator and booklet in accordance with claim 1 wherein said pages include indicia and guidelines for recording notes.

6. A combined calculator and booklet in accordance with claim 1 wherein said pages include indicia and guidelines for recording appointments.

7. A combined calculator and booklet in accordance with claim 1 wherein one or more of said pages are for recording address information, wherein one or more of said pages are for recording appointments, and wherein one or more of said pages are for recording notes.

8. A combined calculator and booklet in acordance with claim 1 wherein said booklet is connected to said back plate by adhesive.

9. A combined calculator and booklet comprising:
   (a) a calculator including a front surface having means for receiving and displaying data and a back plate;
   (b) a plurality of pages for receiving information in the form of a continuous strip folded to form said pages into a booklet which can be opened and closed in an accordion fashion;
   (c) one page of said booklet being connected to said back plate such that said calculator forms a front cover for said booklet; and
   (d) a back cover connected to said booklet for covering said pages, said back cover being movable relative to the back plate of said calculator.

* * * * *